United States Patent [19]

Chang

[11] Patent Number: 5,784,143
[45] Date of Patent: Jul. 21, 1998

[54] SPECTACLE FRAME HAVING REVERSE NOSE PAD

[75] Inventor: Byung Jin Chang, Ann Arbor, Mich.

[73] Assignee: General Scientific Corporation, Ann Arbor, Mich.

[21] Appl. No.: 821,565

[22] Filed: Feb. 26, 1997

Related U.S. Application Data

[63] Continuation of Ser. No. 467,721, Jun. 6, 1995, abandoned, which is a continuation-in-part of Ser. No. 160,970, Dec. 3, 1993, Pat. No. 5,446,507.

[51] Int. Cl.⁶ .................................................... G02C 5/12
[52] U.S. Cl. .................................. 351/138; 351/136
[58] Field of Search ................................ 351/136, 137, 351/138, 139, 78, 79, 80, 81, 82, 65, 76, 41, 158

[56] References Cited

U.S. PATENT DOCUMENTS 412,442  10/1889  Wells ........................................ 351/79
600,496  3/1898  Meyrowitz .............................. 351/138

Primary Examiner—Hung X. Dang
Attorney, Agent, or Firm—Gifford,Krass,Groh,Sprinkle,Patmore,Anderson&Citkowski

[57] ABSTRACT

An improved nose pad and spectacle frame. The spectacle frame includes a pair of temple pieces, a brow bar connecting the temple pieces, eye encircling rims depending from the brow bar, and reversely mounted nose pads which extend toward the tip of the user's nose, rather than the eyes. Optionally, a second pair of conventionally mounted nose pads may be provided. The reversely mounted nose pads improve weight distribution to minimize chafing, soreness and fatigue.

10 Claims, 6 Drawing Sheets

SPECTACLE FRAME HAVING REVERSE NOSE PAD

CROSS REFERENCE TO RELATED APPLICATION

This is a continuation of application Ser. No. 08,467,721 filed Jun. 6, 1995 now abandoned which is a continuation-in-part of U.S. Pat. application Ser. No. 08/160,970, filed Dec. 3, 1993 now U.S. Pat. No. 5,446,507.

FIELD OF THE INVENTION

The present invention concerns spectacle frames and, more particularly a pair of spectacle frames having a nose pad uniquely designed for improving weight distribution, and minimizing chafing and soreness.

BACKGROUND OF THE INVENTION

Telemicroscopic instruments are widely used for magnifying a work area during precision work such as delicate surgery, dental work, inspection of circuit board solder joints, assembly of miniature parts, and jewelry making. A typical telemicroscopic instrument includes a pair of telemicroscopic loupes which are adjustably mounted to an eyeglass frame or head mount. The telemicroscopic loupes combine the long working distance of the telescope with the high quality magnification of the microscope. This type of optical instrument provides the user with a magnified image of the work area with a field of view at about arms length. Hence, the wearer is able to coordinate the work being performed by the hands with what is being seen by the eyes. A Galilean type of telemicroscope is disclosed in copending patent application Ser. No. 08/093,839, filed Jul. 19, 1993 and assigned to the assignee of the present invention, the disclosure of which is hereby incorporated by reference.

As mentioned, the telemicroscope is typically mounted on either an eyeglass frame or special head mount. U.S. Pat. application Ser. No. 08/093,831, filed Jul. 19, 1993 and assigned to the assignee of the present invention, the disclosure of which is hereby incorporated by reference, discloses an ocular mounting assembly for mounting a telemicroscope upon a pair of conventional spectacle frames and permitting adjustment or positioning in five different ways. As can be seen in FIG. 2 of the referenced application, the spectacles to which the telemicroscope is mounted by means of the ocular mounting assembly is essentially conventional in construction. The ocular mounting assembly is mounted to the spectacle frame below the bridge piece thereof, and the eye glasses are positioned on the user's face in the usual manner.

Mounting the telemicroscope so that it depends from the bridge of the spectacle frame has certain disadvantages due to the positional relationship between the lenses of the telemicroscope, the lenses of the eye glasses, and the wearer's own eyes. In particular, the telemicroscope positioned thus is relatively far away from both the lenses of the spectacle's and the wearer's eyes, thus undesirably reducing the field of vision. Moreover, in a conventional pair of spectacle frames, the lens encircling rims of the frames and the lenses mounted therein are disposed almost perpendicularly to the temple pieces of the frames. This causes aberrations introduced by the lower portion of the eye glass lenses since the lenses of the telemicroscope are often disposed at an angle with respect to the lenses of the spectacles; thus, an optical axis defined between the wearer's eye and the microscope lenses will cross the plane of the eye glass lens at an undesirable, oblique angle.

Furthermore, the weight of a telemicroscope, camera or similar device can be considerable. In a conventional eyeglass frame, the weight is supported mainly on very small nose pads which are mounted on the face side of the frames. The pressure exerted on these pads frequently leads to chafing and soreness.

In co-pending patent application Ser. No. 08/160,970, I disclose a redesigned frame with an elevated bridge and other refinements particularly suited for mounting a pair of telemicroscopes thereon. Disclosed in the referenced patent application is a spectacle frame with an unusual and novel nose pad arrangement. In particular, the nose pads are "reversed;" that is, rather than being mounted on the inside of the frame, they are mounted on the outside. This arrangement helps reduce fatigue on the wearer's nose by redistributing the weight of the telemicroscope. Furthermore, this novel nose pad arrangement can be used for spectacles in other applications than mounting telemicroscopes; other types of safety, special vision, and visually impaired spectacles are often quite heavy and cause nose fatigue. All of these can benefit from redesigned nose pads.

Clearly, there is a need for a redesigned spectacle frame and nose pad which is relatively conventional in appearance, but has redesigned weight distribution characteristics to help reduce wearer fatigue. In particular, there is a need for a redesigned spectacle frame which mounts the nose pads or nose pad assembly on the outside of the spectacle frame to improve weight distribution and minimize fatigue, chafing and soreness.

SUMMARY OF THE INVENTION

The invention described and claimed herein has been designed to overcome the deficiencies of the prior art noted above. It is an improved and redesigned nose pad and spectacle frame. The spectacle frame includes a pair of temple pieces for supporting said frame on the ears of a wearer, and a brow bar pivotally connected to each of the pair of temple pieces. The brow bar crosses the wearer's face above his eyes. A pair of lens encircling rims depend from the brow bar.

In one preferred embodiment of the present invention, a nose pad member for supporting the frame on the opposite sides of the bridge of the nose of the wearer are reversely mounting on the lens encircling rims. That is, it is mounted such that it extends in a direction away from the temple pieces and toward the tip of the wearer's nose. Conventionally, nose pads are mounted on the rims such that they extend toward the user's eyes. As will be subsequently be explained in greater detail, reversely positioning of the nose pad member improves the weight distribution of the spectacles and auxiliary devices over the frame and results in less fatigue, chafing and soreness. The reverse mounted nose pad member also permits the spectacles and devices carried thereon to be positioned closer to the user's eyes, thus greatly improving the field of view. The improved frames of the present invention may also be constructed with two nose pad members, one mounted in the standard manner and one mounted reversely. This embodiment greatly improves the weight distribution of frame, lenses, and instrument.

In another preferred embodiment of the present invention, the reversely mounted nose pad member is in the form of a single string nose pad. Optimally, a second, conventually mounted nose pad member, either a single string or a conventional pair, may also be provided for enhanced weight distribution.

3

In yet another embodiment, the nose pad of the present invention is provided in clip-on form for attachment to a set of conventional spectacle frames.

BRIEF DESCRIPTION OF THE DRAWINGS

The following detailed description may best be understood by reference to the following drawings in which.

DETAILED DESCRIPTION OF THE DRAWINGS

Figure 1:
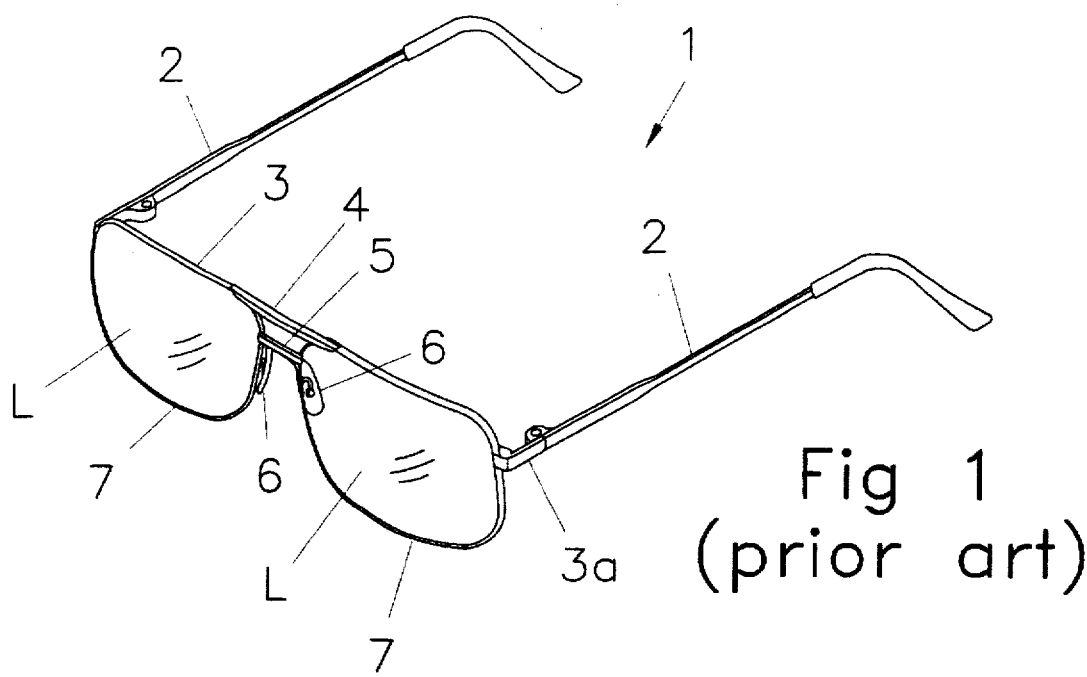
FIG. 1 is a perspective view of a prior art pair of spectacles.

Throughout the following detailed description, like numerals are used to reference the same element of the prior art and the invention shown in multiple figures thereof. Referring now to the drawings, and in particular to FIG. 1, there is shown a conventional, prior art spectacle frame 1 which optionally may be used to mount a telemicroscope or other optical accessory thereon. The spectacle frame 1 includes a pair of temple pieces 2 which are pivotally attached to a brow bar 3 which crosses the user's face at a location thereon just above the user's eyes. Conventionally, the brow bar 3 includes short side extensions 3a which extend around each side of the wearer's head. The brow band 3 is, typically, attached to these extensions 3a. A pair of depending, lens encircling rims 7 have mounted therein a pair of lenses 1. A pair of nose pads 6 are mounted on the depending rims 7 such that they extend toward the temple pieces and, consequently, the eyes of the user. A bridge 5 supports the spectacle frame 1 upon the nose of the user. This prior art spectacle frame 1 also includes a reinforcement piece 4 which helps to strengthen the brow bar 3 in the area above the bridge 5.

Figure 2:
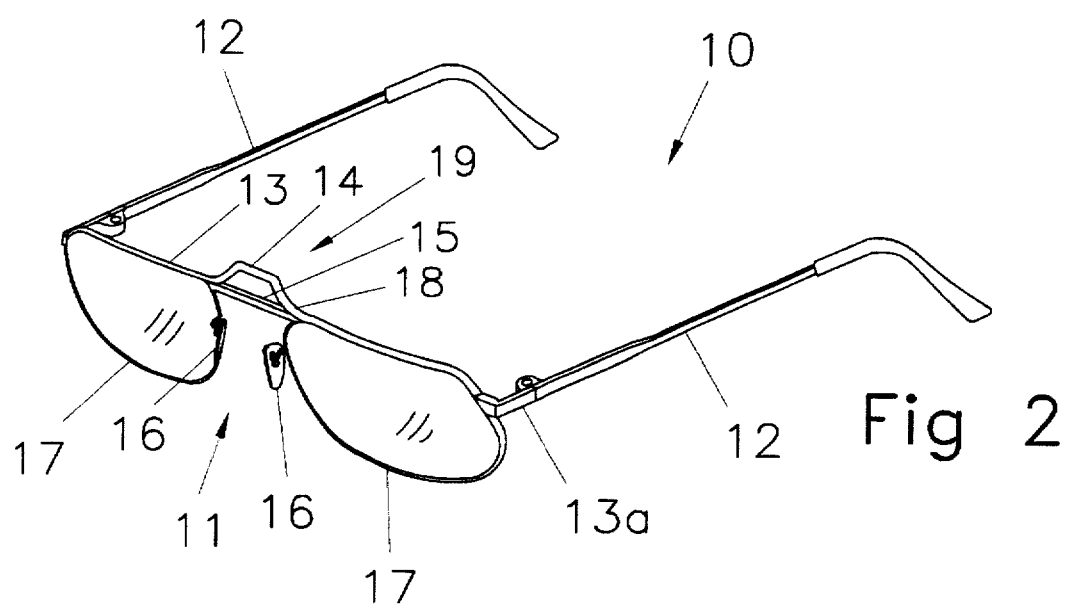
FIG. 2 is a perspective view of one embodiment of an improved spectacle frame according to the present invention showing the various features thereof.

FIG. 2 depicts one embodiment of the redesigned frame 10 of the present invention. Like the prior art frame 1, it also includes a pair of temple pieces, identified by the reference numeral 12, which are pivotally mounted to a brow bar 13 via side extensions 13a. Similarly, the frame 10 of the present invention includes a pair of lens encircling rims 17 which depend from the brow bar 13.

Frames 10 as depicted also include the features of the angled temple pieces and the elevated bridge disclosed in co-pending Ser. No. 08/160,070, the disclosure of which is herein incorporated by reference. However, the reverse or double pair of nose pads may be advantageously employed with other frame designs, such as the prior art design depicted in FIG. 1.

4

The frame 10 of the present invention includes an elevated bridge assembly 19 which supports the spectacle frame 10 on the nose of a user. Because of the elevated bridge assembly 19 and the angular relationship between the temple pieces 12 and the rims 17, the embodiment shown in FIG. 1 is particularly suitable for mounting a telemicroscope thereto, as is explained more fully in Ser. No. 08/160,970. However, the present invention can be advantageously practiced without these additional features. Bridge assembly 19 further includes a raised element 14 which actually extends above the brow bar 13 and is connected thereto via tapering supports 18, and a cross-brace 15. Thus, the entire bridge assembly 19 of the frame 10 is elevated when compared to the corresponding structures 4, 5 of the prior art frame 1.

A nose pad member 11 in the form of a pair of nose pads 16 are reversely mounted on the lens encircling rims 17. That is, instead of being mounted so they extend rearwardly, as is true of the prior art frames, the nose pads 16 are mounted such that they extend forwardly toward the tip of the user's nose and in a direction opposite of the temple pieces 12; this permits the lenses 1 mounted in the spectacle frame 10 to be positioned considerably closer to the user's eyes e. Furthermore, the reverse mounted nose pads 16 also improve the distribution of the weight of the frame 10, lenses 1 and any additional structures mounted thereto. Although depicted as a pair of opposed nose pads, the nose pad member 11 could also comprise a single string nose pad.

The reversely mounted nose pads 16 of the present invention are depicted as similar in shape to the conventionally mounted pads 6 of FIG. 6 of course, pads 16 have been rotated approximately 180°. However, other shapes could be used.

In an alternative embodiment (not depicted), the temple pieces 12 could be pivotally mounted on the lenses, or on a short extension attached thereto, and the rims could be eliminated. Thus, the nose pads 16 would also be mounted directly to the lenses in the same position depicted in FIG. 2. Thus, the advantages of the present invention could be achieved in a rimless pair of spectacles, although such would not be as sturdy as the embodiment depicted.

Figure 3:
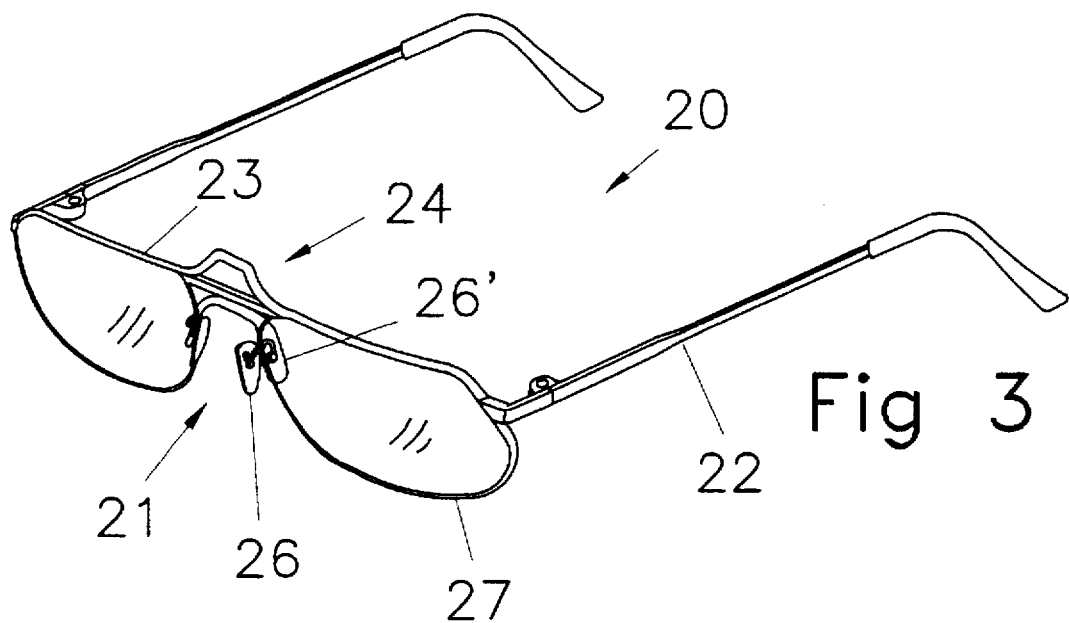
FIG. 3 is a perspective view of another embodiment of a frame according to the present invention.

FIGS. 3 depicts another embodiment 20 of the frame of the present invention. Frame 20 includes brow band 23, temple pieces 22, rims 27, and elevated bridge assembly 24. A nose pad member 21 in the form of a pair of reversely mounted nose pads 26 extends in a direction opposite the temple pieces in a manner similar to that of the frames 10 depicted in FIG. 2. Nose pad member 21 also includes a single string nose pad 26' that is mounted in the standard manner; i.e., on the inside of the frame 20 to extend toward the wearer's nose. The double pair of nose pads 26, 26' greatly improve the weight distribution characteristics of the frames 20 and are much more comfortable.

Figure 4:
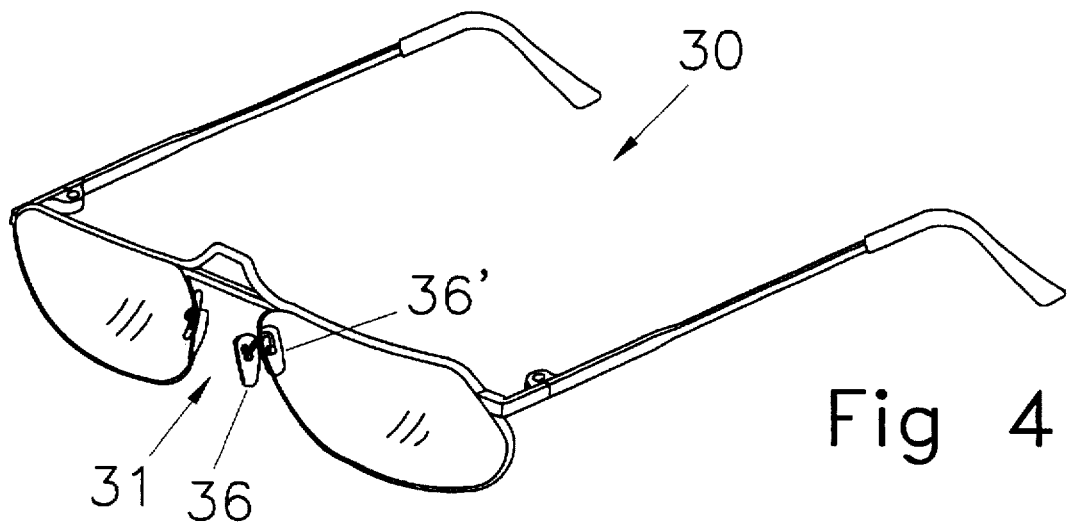
FIG. 4 is a perspective view of yet another embodiment of a frame according to the present invention.

FIG. 4 depicts yet another embodiment 30 of the improved frame of the present invention. This embodiment 30 is generally similar to the embodiment shown in FIG. 3 and includes a nose pad member 31 which includes both reversely mounted nose pads 36 as well as conventionally mounted nose pads 36' which, unlike the FIG. 3 embodiment, are an opposed pair, rather than a single string.

Figure 5A:
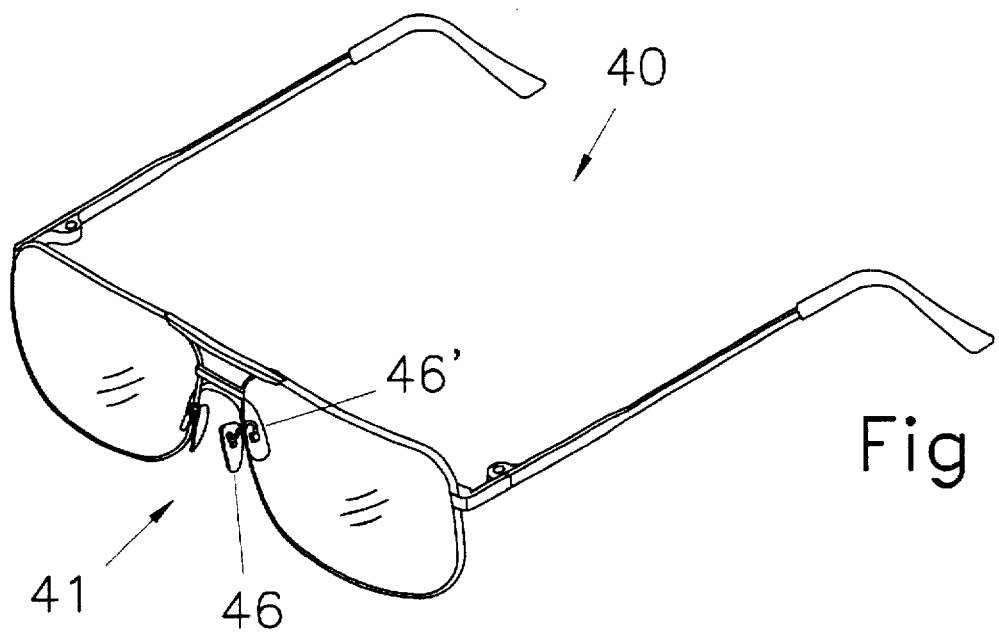
FIGS. 5a and 5c are, respectively, perspective, top and front views of yet another embodiment of the frames of the present invention.
Figure 5B:
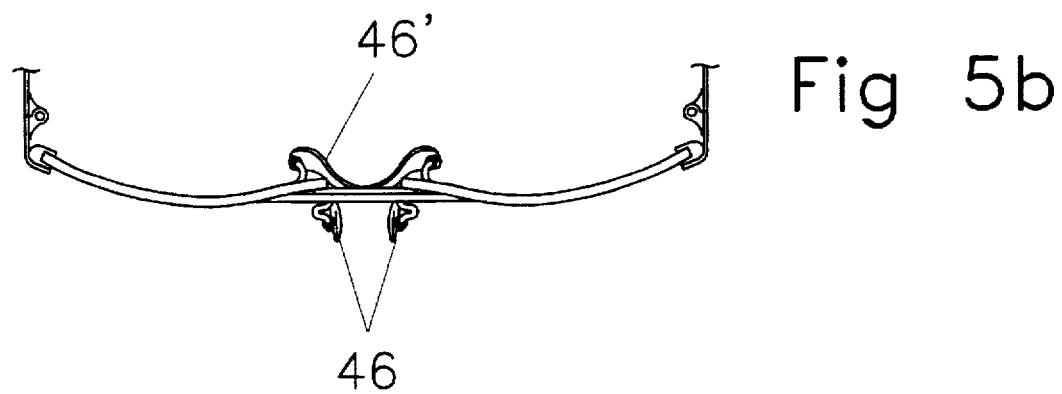
Figure 5C:
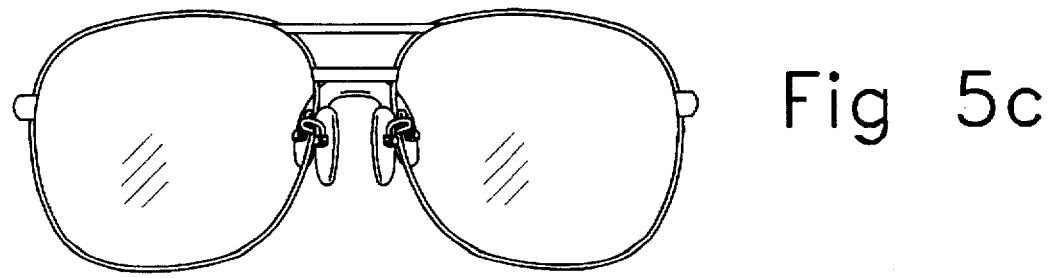

FIGS. 5a–5c depict yet another embodiment of a frame 40 according to the present invention. Frame 40 includes a nose pad member 41 generally similar to that of the FIG. 3 embodiment including a pair of reversely mounted pads 46 and a conventionally mounted single string pad 46'. However, rather than having an elevated bridge and angled lenses, the frame 40 is generally similar in design to the prior art frame depicted in FIG. 1, modified with the novel nose pad number 41 of the present invention.

Figure 6A:
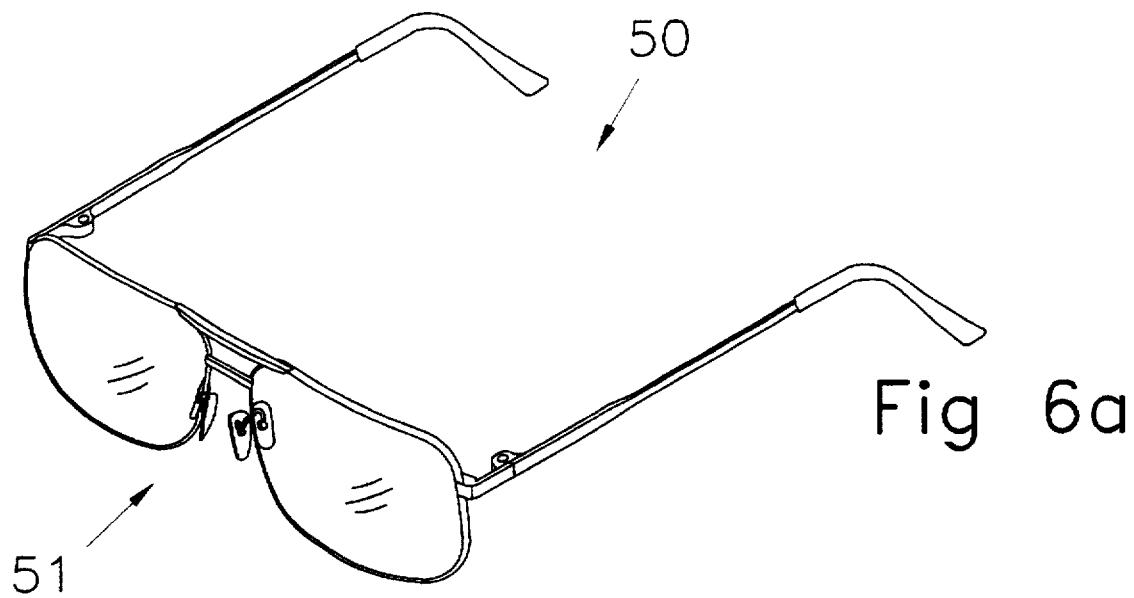
FIGS. 6a–6c are, respectively, perspective, top and front view of another embodiment of the frame of the present invention.
Figure 6B:
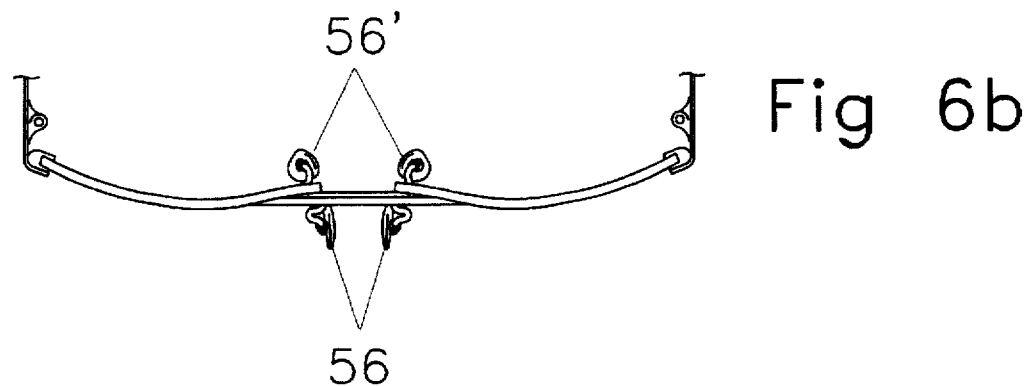
Figure 6C:
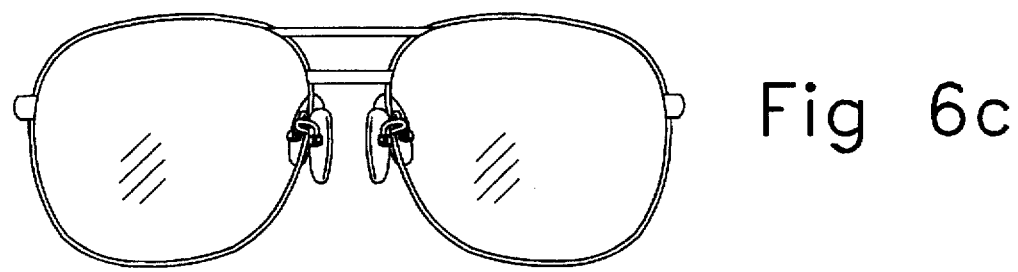

FIG. 6a–6c shows another embodiment of the nose pad of the present invention installed on the prior art frame structure of FIG. 1 in this frame 50, the nose pad member 5' includes a pair of reversely mounted nose pads 56 and a pair of conventionally mounted nose pads 56'.

Figure 7A:
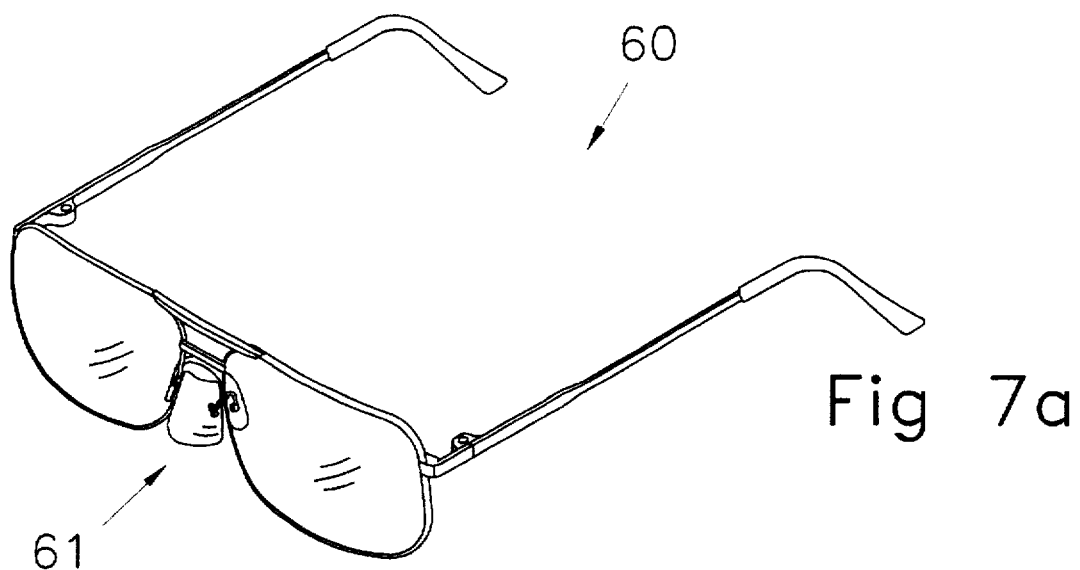
FIGS. 7a–7c are, respectively, perspective, top and front view of another embodiment of the frame of the present invention.
Figure 7B:
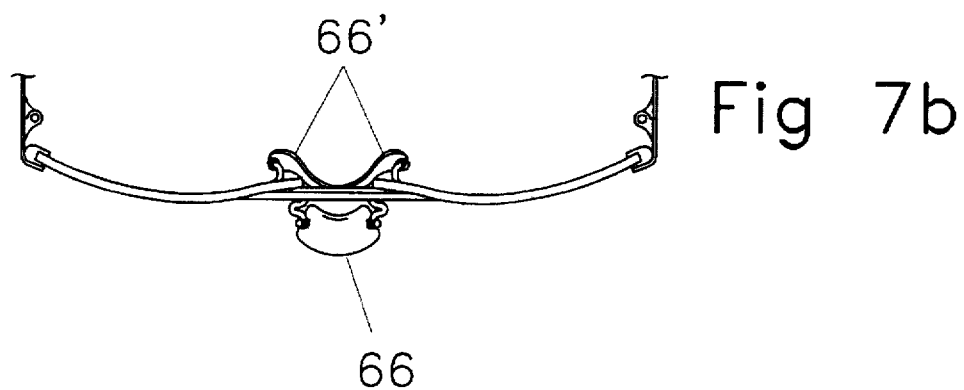
Figure 7C:
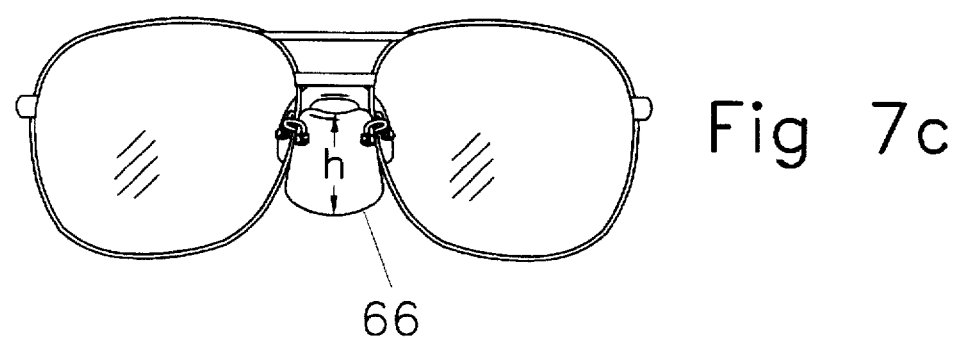

FIGS. 7a'7c shows yet another embodiment of the improved nose pad member of the present invention. In this frame 60, the nose pad member 61 includes a pair of single string pads 66, 66', single string pad 66 being reversely mounted, and paid 66' being mounted in the conventional manner. Single string pad 66 extends all the way across the front of the top of the nose and has a height h relatively enlarged compared to conventional single string pad 66' (as can best be seen in FIG. 7c) for even better weight distribution and comfort.

Figure 8A:
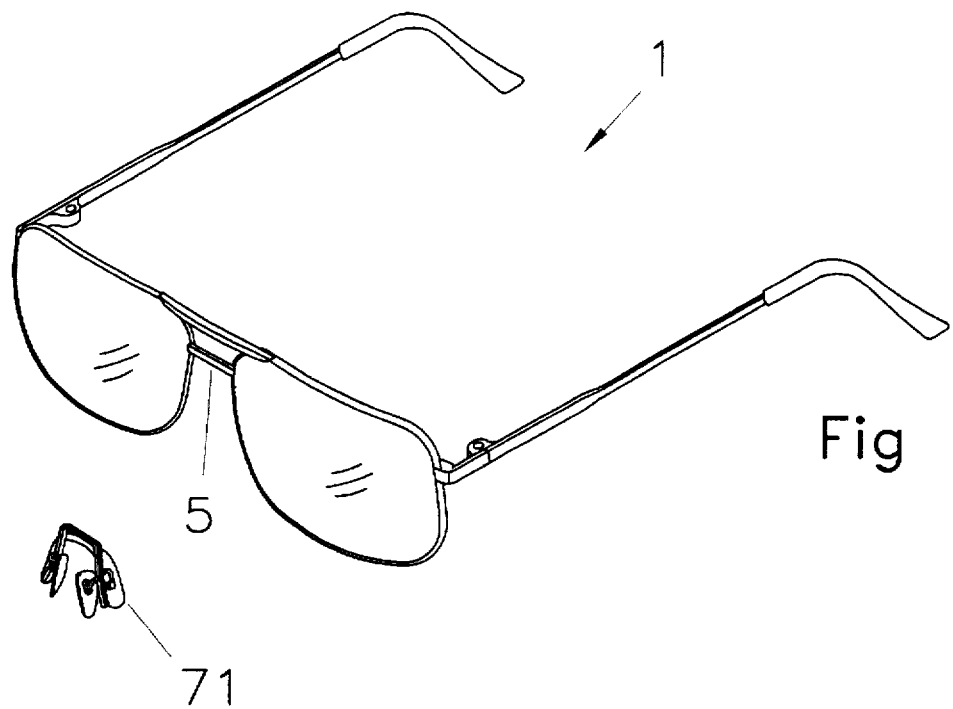
FIGS. 8a–8b show, respectively, a clip-on version of the nose pad of the present invention both separate from and installed on a conventional frame.
Figure 8B:
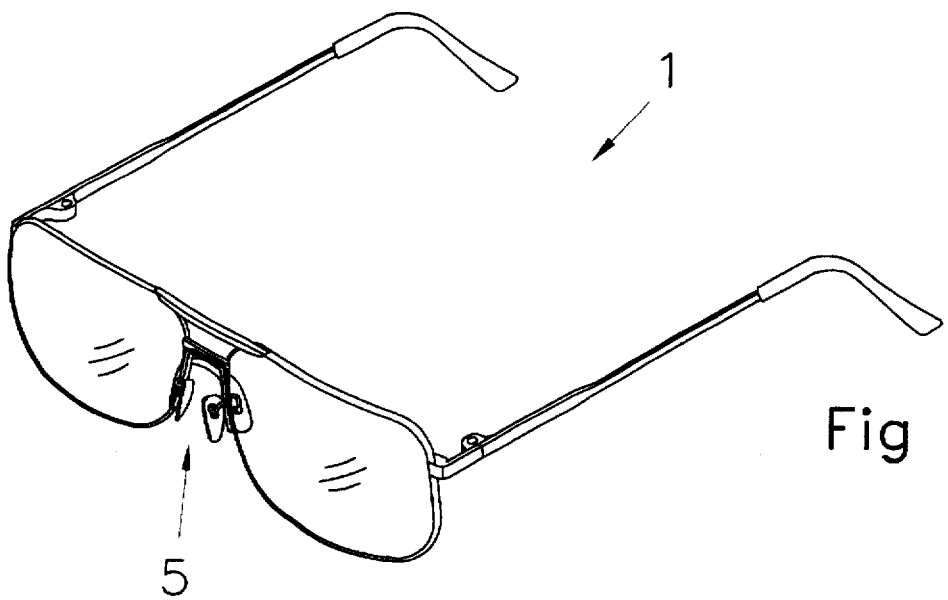

Yet another embodiment of the present invention is shown in FIGS. 8a–8b in the form of a clip-on nose pad member 71 which can be installed on the bridge 5 of a conventional pair of spectacle frames in the manner depicted in FIG. 8b. The nose pad member 71 includes a reversely mounted pair of pads 76 and a conventionally mounted single string paid 76'. With the clip-on version, any standard pair of frames may obtain the advantages of the present invention.

Thus, a redesigned and improved spectacle frame with improved weight distribution characteristics has been described with reference to certain exemplifications and embodiments thereof. The reverse mounting of the nose pad permits the lenses to be worn closer to the eye, an advantage in some applications, as explained more fully in 08/160,970. Furthermore, the reverse mounted and/or double nose member greatly improves the weight distribution of the frames and any optical instrument mounted thereto, thus minimizing chafing, soreness and fatigue. Doubtless, by carefully reviewing the present disclosure, one skilled in the art may design variations in the present invention, but such design variations are considered to be within the scope of the present invention. It is the claims, and all reasonable equivalents thereof, rather than the particular depicted exemplifications and embodiments, which define the true scope of the present invention.

I claim:

1. A spectacle frame having a pair of lenses mounted therein, said frame comprising:

a pair of temple pieces for supporting said frame on the ears of a wearer; and first and second nose pad members for supporting said frame on opposite sides of the bridge of the nose of said wearer, wherein the entirety of said first nose pad member is disposed substantially forwardly of said rims, and the entirety of said second nose pad member is disposed substantially rearwardly of said rims.

2. The frame of claim 1 wherein said first nose pad member is a single string nose pad.

3. The frame of claim 1 wherein said first nose paid member comprises a pair of opposed nose pads.

4. The frame of claim 1 where said second nose pad member comprises a pair of opposed nose pads.

5. The frame of claim 1 wherein said second nose pad member is a single string nose pad.

6. A nose pad member for use with a spectacle frame including a pair of temple pieces and a pair of lenses depending therefrom, said nose pad member comprising:

a pair of nose pads for supporting said spectacle frame on opposite sides of the bridge of the nose of said wearer, each nose pad having an inner surface for making contact with the bridge of the wearer's nose and an outer surface oriented away from the bridge of the wearer's nose, each nose pad being connected to the spectacles at opposing points on either side of the wearer's nose through a separate pliable element, each element having a second end which pivotably connects centrally to the outer surface of its respective nose pad, and wherein the entirety of both of said nose pads, substantially including both pliable elements are disposed forwardly of said rims.

7. The nose pad member of claim 6 further comprising a second, inside nose pad member mounted on the frame so as to extend in a direction toward the wearer's eyes.

8. The nose pad member of claim 7 wherein said first nose pad member is a single string nose pad having a height h greater than that of the second nose pad member.

9. The nose pad member of claim 6 wherein the nose pad member may be clipped on to a bridge of a pair of conventional spectacle frames.

10. A clip-on nose pad assembly for use with a spectacle frame and mountable to a bridge piece thereof, said clip-on nose pad assembly comprising:

first and second nose pad members for engagement with and operational to support said frame on the bridge of the nose of a wearer, said first nose pad member including a pair of spaced, opposed nose pads, and said second nose pad member including a single string nose pad, said first and second nose pad members being arranged such that, when said nose pad assembly is mounted on said spectacle frame bridge piece, one of said first and second nose pad members is disposed to extend inwardly of said frame and the other is disposed to extend outwardly therefrom.

* * * * *